Figures 5, 6:
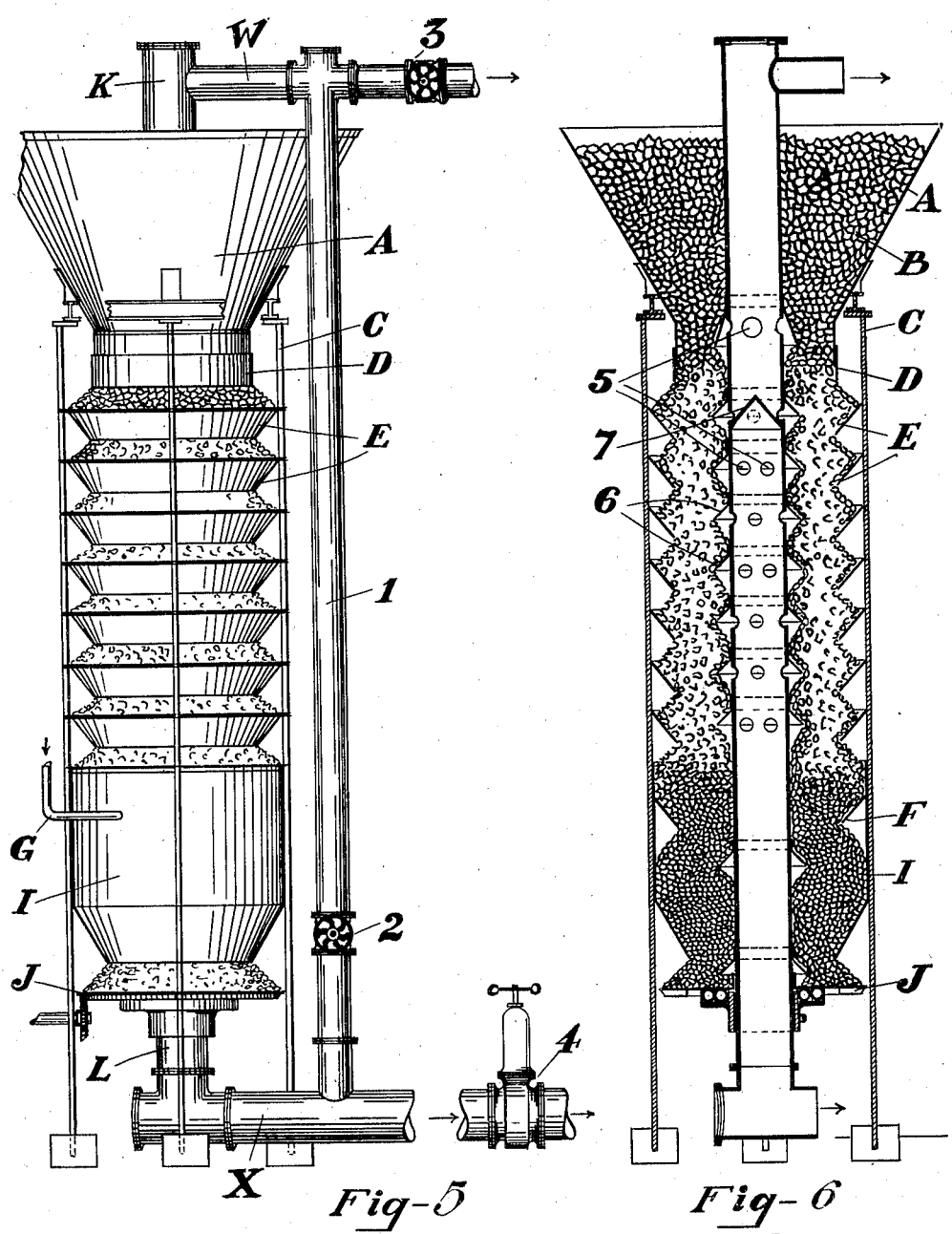

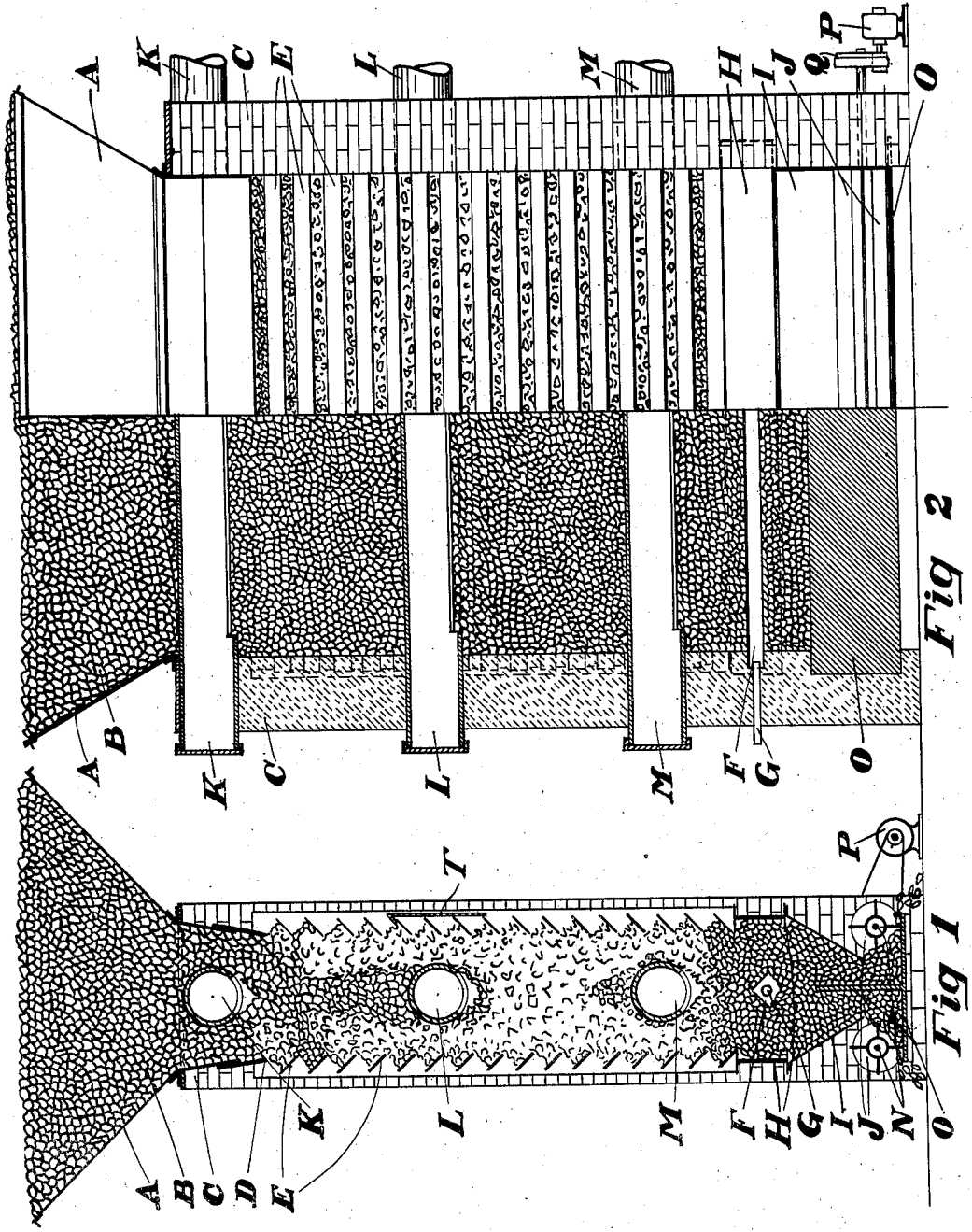

Aug. 31, 1926.
W. W. ODELL
1,598,217
GAS MAKING AND CARBONIZING APPARATUS AND PROCESS
Filed Dec. 17, 1923    3 Sheets-Sheet 2
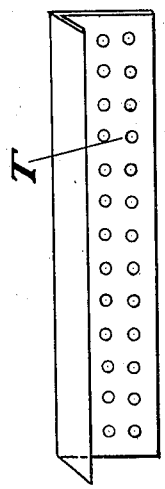
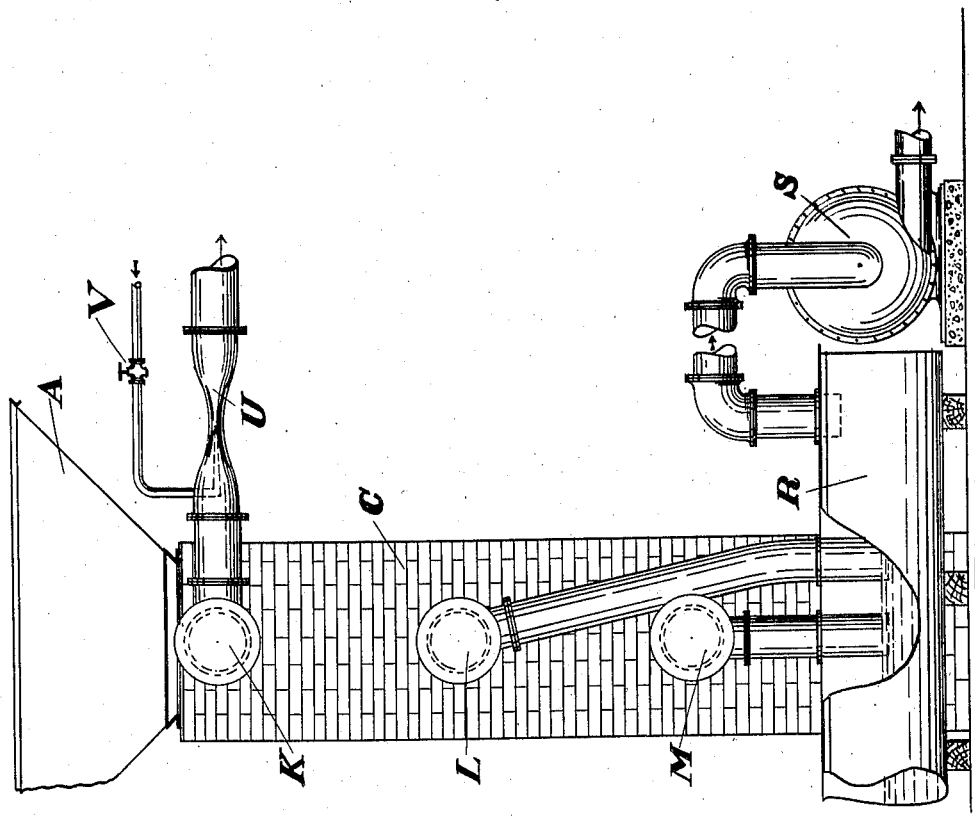
Witnesses
Grace Egermayer.
Albert G. Egermayer
Inventor.
William W. Odell Aug. 31, 1926. 1,598,217
W. W. ODELL
GAS MAKING AND CARBONIZING APPARATUS AND PROCESS
Filed Dec. 17, 1923 3 Sheets-Sheet 3

Witnesses Inventor

Patented Aug. 31, 1926.

1,598,217

UNITED STATES PATENT OFFICE.

WILLIAM W. ODELL, OF MINNEAPOLIS, MINNESOTA.

GAS-MAKING AND CARBONIZING APPARATUS AND PROCESS.

Application filed December 17, 1923. Serial No. 681,250.

This invention relates to a means and process for expelling moisture and volatile matter from carbonaceous materials, such as coal, lignite, shale, peat, wood and the like, utilizing partial combustion of the fuel as a source of heat, also for gasifying or partly gasifying said substances by the producer gas reactions.

The objects of this invention are:

(1) To decrease the cost of a carbonizing unit per ton day of material treated.

(2) Increase the capacity of a definite size carbonizing unit.

(3) Simplify construction and operation of a unit.

(4) Eliminate clinker difficulties in the carbonizing and gas making process.

(5) Make the hot zone (clinker zone) visible at all times.

(6) Eliminate the troublesome blowholes common to producer gas processes.

(7) Provide a carbonizer in which the stage and progress of carbonization is always visible.

(8) Provide a simple means for continuously carbonizing materials.

(9) Provide a means for controlling the degree and rate of carbonization.

(10) Provide a means for recovering by-products with a minimum amount of cracking.

(11) Provide a convenient means for taking the gas off at more than one level without its passing through a high-temperature fuel bed.

(12) Provide a means for causing a mixing of the fuel particles during their carbonization.

(13) Provide a simple means for cooling and discharging the carbonized material.

(14) Provide a means for separating the lean gas from that evolved during the latter stage of carbonization.

(15) Provide an apparatus which can be used as either a carbonizer or gas generator, the change from the one to the other being substantially instantaneous.

(16) Provide a greater combustion zone area than is found in other producers with a given mass of fuel, and

(17) To make it possible to manufacture producer gas from the fine sizes of low grade fuels.

I attain these objects by means of the apparatus shown in the accompanying drawings. Figure 1 is a vertical end-section of the carbonizer-producer. Figure 2 is a front view of the carbonizer-producer partly in section and partly in elevation, and showing the gas offtakes, the fuel bed, the steam cooling arrangement and the discharge paddles. Figure 3 is an end elevation of the same apparatus showing a main for taking the gas off under controlled suction conditions. Figure 4 is, in perspective, a hanger plate to be hung over baffles under conditions stated. Figure 5 is an elevation of another carbonizer-producer apparatus involving the same principles, in which I successfully practice my process, and shows baffles, gas offtakes with control valves, discharge means, fuel hopper and a portion of the exposed fuel bed; Figure 6 is a vertical section of the same apparatus showing the internal baffles.

Similar letters refer to a similar parts throughout the several views. In Figures 5 and 6 numerals are used to designate parts not shown in the other views.

In the usual carbonizing apparatus in use at present, heat is applied to the material in process by transfer through walls of refractory material. The rate of heat transfer is slow, and without recuperation or regeneration the fuel consumption is high; the price of such apparatus is prohibitive of its use in carbonizing low grade fuels which yield a relatively low percentage of char and gas of little commercial value. To increase the rate of carbonization of such fuels air has been introduced into the fuel mass from within and the hot gases have been caused to impart heat to said fuel. Although this increased the capacity and decreased the oven cost per ton of fuel treated, difficulties arose from the formation of clinkers when certain fuels of low ash fusion point were carbonized. These difficulties are experienced also in producer gas generators. One of the chief aims in my process is to put the clinker zone on the outside and in full view at all times so that clinkers can be removed as formed with the minimum effort; this difficulty is further mitigated by increasing the hot surface (grate area) through which air is caused to pass, thus decreasing the rate of combustion at any particular point, and by keeping the particles of fuel in motion during processing.

In Figure 1 A is a fuel hopper filled with fuel B. C denotes the retaining end walls, D is the curtain under which the fuel passes to the first baffle. The baffles are shown at E. F is an angular, deflecting refractory, preferably metal, forming a space into which moisture or steam is injected through pipe G. The I beams shown at H support the discharge hopper I. Rotating discharge paddles are shown at J, supported on shafts N. O is a T-shaped plate forming a base plate and a guide to promote even discharge of the carbonized product. K, L, and M are gas offtake pipes cut away on the under side. P is a means for rotating the discharge paddle. T is a removable baffle hanger-plate.

In Figure 3, R is a hydraulic main, S is an exhauster. V is a valve in a steam supply line to constriction U in the pipe from K. Gas is ejected through this pipe.

In Figure 5, A denotes a fuel magazine or hopper, C is the supporting members for the hopper and the outer baffles which latter are shown at E. G is the steam inlet pipe in jacket I. J is the discharge turntable and K and L are, respectively, the upper and lower gas offtake pipes, K is connected with an exhauster by means of pipe W, which latter has a control valve ahead of the exhauster shown at 3. L is also connected with an exhauster by means of pipe X having a valve as shown at 4. A common exhauster may be used when desired but it is not shown since it is not a part of this invention. X and W are connected with pipe 1 which has a valve at 2. In Figure 6 the same lettering and numbering is used; the gas offtake ports are shown at 5, the baffles within the fuel mass are shown at 6, and 7 is a removable seal separating the lean gas evolved in the upper fuel bed from the richer gas evolved in the lower part of the fuel bed.

To carbonize materials I proceed as follows: The apparatus shown in Figure 1 is filled with the crushed material to be carbonized as shown and a moderate sub-atmospheric pressure is produced in the gas offtakes K, L and M by means of an exhauster. Means for exhaustion are shown in Figure 3 at S and U. A fire is now kindled in the fuel mass above the upper exterior baffles by applying liquid fuel to the exposed fuel in the upper part of the apparatus and igniting it. After a few moments the discharge paddles J are started in rotary motion by means of motor P or other suitable source of power. The material (fuel) travels from the upper hopper downward and ignites just below the apron D and on the surface only. In passing on downwards the fuel particles mix by reason of the tumbling action caused by the coacting exterior baffles E and the interior baffles which latter are also the gas offtake pipes K, L and M. A glow is maintained over the exposed surface of the fuel but the rate of discharge is maintained so high that the fuel consumption is but a small part of the fuel carbonized. The degree of carbonization is controlled by the rate of discharge, the pressure maintained in the gas offtakes K, L and M, the thickness of the fuel bed and size of fuel particles supplied to the fuel hopper A. As the pressure is decreased in the offtakes the quantity of air drawn into the fuel mass increases which in turn liberates more heat by reason of the increased rate of combustion. Increasing the vacuum in the gas offtakes therefore increases the degree of carbonization, other factors remaining constant. Increasing the rate of discharge decreases the degree of carbonization. Adjustment is maintained between these two conditions, vacuum and rate of discharge, in accordance with the capacity desired. Upon increasing the capacity or throughout a limit is reached only when the fuel passing below curtain D fails to ignite. This limit is not the same for all fuels. With lignite containing 30 to 40 per cent of moisture I find it desirable to extend curtain D lower than shown in Figure 1 for it is necessary in this instance to pass the combustion gas (the gas evolved in the ignition zone of the carbonizer) upward counter to the flow the fuel, in order to maintain a state of ignition above the upper baffles, at a high rate of carbonization.

The gas taken off through offtake K is chiefly $CO_2$ and $N_2$ with small amounts of CO and $O_2$ and is usually not worth saving. The gas collected through L and M is a good grade of producer gas. The number of baffles and gas offtakes are not limited to the numbers shown in the figures, but depend upon the nature of the fuel treated and upon the capacity and the degree of carbonization desired.

Moisture is blown in, preferably as steam, through pipe G into the space below F for the purpose of quenching and cooling the carbonized product (char) and for increasing the yield of ammonia. Some water gas is made as a result of this injection of steam, the quantity depending upon the temperature of the char at this part of the fuel mass, and upon the distance between F and M.

The apparatus shown in Figures 5 and 6 is operated in the manner as described excepting the method of removing the gas. In this instance the gas is removed by an upright pipe KL passing through the fuel mass, with gas ports 5 and with interior baffles 6 which have the twofold duty of aiding the mixing of the fuel particles in their downward course, and of preventing said particles from entering the gas offtake through the gas ports. Gas is drawn off through K, W and L, X (Figure 5) by exhausters. It is necessary to maintain a definite relative amount of vacuum in W and X in order to maintain the desired incandescent glow over the exposed surfaces of fuel between the exterior baffles, therefore W and X are connected with pipe 1 having a valve at 2 so that when it is desirable to use one exhauster only all of the gas can be drawn out through valve 4 by closing valve 3 and opening valve 2 sufficiently to give the give the desired vacuum. Valve 2 controls the relative quantity of gas drawn through W and X when one exhauster only is used. When two exhausters are used valve 2 functions in a similar manner but valves 3 and 4 are then both open. In place of discharge paddles a rotating disk is used, to expel the carbonized product, as shown at J.

In making producer gas by the substantially complete gasification of the fuel it is only necessary to reduce the rate of discharge at the base thus slowing the downward velocity of the fuel to such an extent that it is substantially consumed within the apparatus, that is, before passing below the bottom exterior baffle. When gasifying a "strong-coking" coal I sometimes find it desirable to mix some non-coking fuel or ashes with the fuel used so as to eliminate the caking and matting of the fuel which sometimes occurs because of the slow downward movement of the fuel particles. The gas is withdrawn as made through the gas offtakes K, L and M in the different figures. The carbonizer-producer is thus a suction type gas producer in which the outer walls form the grates which the fuel passes in a downward direction as it is gasified; the air passes substantially across the path of travel of the fuel which latter forms a thin bed from the grates to the gas offtakes.

A particular feature of my apparatus is that means are provided for drawing air into the fuel over a large slowly moving surface of it and for withdrawing the gas at different levels and through a gas conduit within the fuel mass at a relatively high rate of speed, thus minimizing the chances for deposit of matter suspended in the gas and increasing the time of contact of the air and fuel in the hot zone. The baffles function not only as a means of support for the fuel but also for causing a tumbling motion of the fuel particles and for maintaining a visible hot zone or clinker zone. The inner and outer baffles coact in causing the tumbling of the fuel particles and in determining the thickness of the fuel bed. The distance between the inner and outer baffles is preferably less than two feet when fuel is being carbonized only and small sizes of fuel only are used. When fuel is used which will pass through a screen of one inch mesh excellent results may be obtained with a fuel bed thickness of approximately one foot.

The baffles are shown in the figures in vertical series but when fuels are used which disintegrate upon being heated it may be desirable to employ a somewhat thicker fuel bed at the top than below, in this instance the baffles would not form absolutely vertical series. For this and other reasons the term "substantially vertical" is used in the claims in this application in reference to the baffle series. In making producer gas a slightly greater thickness of fuel bed is sometimes desirable than two feet. When treating shale to recover oil a still thicker fuel bed may be used particularly in the lower part of the carbonizer. A fuel bed one foot thick yields a good grade of producer gas when moderately fine sizes of fuel are used.

The discharge in my process and with the described apparatus is substantially continuous but need not be absolutely continuous, for similar results are obtained with intermittent discharge when the interruption of discharge is frequent and for brief periods only.

The seal shown at 7 in Figure 6 is not necessary for the efficient operation of my apparatus and is only used when it is desirable to separate the lean gas evolved at the top of the apparatus from the richer gas evolved at the lower levels. This separation of the gases is particularly desirable when treating oil shales and similar materials which liberate appreciable amounts of condensable vapors in the lower and hotter part of the carbonizer.

I claim:

1. A process for carbonizing solid fuel and removing the gaseous products, consisting in passing said fuel substantially continuously in a downward direction through a confined combustion zone, igniting the fuel in said combustion zone during its downward passage and maintaining a state of ignition therein by drawing air from without into an outer substantially cylindrical surface of said fuel at a plurality of levels, and removing the resulting gases at a plurality of levels by exhausting through gas offtakes located within said fuel.

2. In a process of carbonizing solid fuel as defined in claim 1, the steps which consist in passing the fuel through the combustion zone in a relatively thin stream, and continuously agitating the fuel particles during their downward passage by a tumbling action, whereby heat equalization of the fuel mass is effected.

3. A process for carbonizing fuel and removing the gaseous products consisting in passing suitably sized solid fuel downwardly from a suitable fuel hopper to a combustion zone, igniting the fuel thereat and conducting it downwardly therein in horizontally thin layers with a substantially continuous tumbling motion of the fuel particles and at a predetermined and controlled rate, exposing the ignited fuel in said combustion zone to the atmosphere in a series of free outer surfaces at different levels, drawing air into said ignited fuel through said free surfaces at a controlled rate and substantially across the path of travel of the fuel, causing said air to react with said fuel and removing the resulting gas at different levels by exhaustion, from gas offtakes located within the fuel mass and withdrawing it therefrom substantially as described.

4. The improvement in the process of carbonizing solid fuel and removing the gaseous products consisting in passing said fuel downwardly into a hot zone, igniting it in said zone passing it in a horizontally thin mass downwardly substantially continuously with a tumbling and rolling motion of the fuel particles through said hot zone simultaneously admitting air to a relatively large exposed-to-air outer surface of the fuel mass in the hot zone at a plurality of levels, and withdrawing the gas through gas offtakes located within the fuel mass through a relatively small fuel surface at a plurality of levels, as herein described.

5. The improvement in the process of carbonizing solid fuel and removing the gaseous products consisting in passing said fuel downwardly into an annular hot zone igniting it in said zone, passing it in a horizontally thin stream downwardly substantially continuously with a tumbling and rolling motion of the fuel particles through said hot zone, simultaneously admitting air to a relatively large exposed-to-air outer surface of the fuel mass in the hot zone at a plurality of levels, and withdrawing the gas through suitable gas offtakes located within the fuel mass through a relatively small fuel surface at a plurality of levels, recovering the lean gas evolved in the upper part of the fuel mass separate from the richer gas recovered from the lower and hotter part of the fuel mass substantially as described.

6. The improvement in the process of carbonizing solid fuel and removing the gaseous products consisting in passing ignited fuel downwardly through a combustion zone in a horizontally thin stream, exposing a visible and large percentage of the outer surface of said fuel to the atmosphere and the action of air at a plurality of levels, drawing air into said fuel through said exposed fuel surface substantially across the downward path of the fuel and withdrawing the gas at a plurality of levels through suitable gas offtakes located within the fuel mass.

7. A process of carbonizing and distilling oil shales and the like consisting in passing said shale downwardly through a combustion zone, substantially continuously, with a tumbling and rolling motion of the particles during their passage through said combustion zone, simultaneously admitting air at a plurality of levels to a relatively large outer surface of the shale mass which is exposed to the atmosphere, withdrawing the resulting gases and distillation products at a plurality of levels through suitable gas offtakes located within the mass of shale recovering the lean gas evolved in the upper part of the shale mass separately from the richer gas containing condensable vapors recovered from the lower and hotter parts of the shale.

8. In a process of carbonizing and distilling carbonaceous materials such as solid fuel and oil shale, the step which consists in drawing air into a confined ignited mass of said material from without through a relatively large exposed outer-wall surface of said material, and withdrawing the gas formed through an off-take located within said mass of fuel.

9. The process of carbonizing and distilling carbonaceous materials such as solid fuel or oil shale, consisting in passing the material downwardly with a tumbling motion from a retaining hopper into a hot zone, igniting said material in said hot zone, drawing air into said material in said hot zone through a large, free tumbling outer-wall surface exposed to the atmosphere and heating it thereby, withdrawing the resulting gases from within the mass of material in process at different levels, the lean gas produced in the upper part of the hot zone being withdrawn separately from the richer gas evolved in the lower and hotter part of said hot zone, passing the heated material downwardly into and through a cooler, and discharging the cooled product below.

10. The process of carbonizing and distilling carbonaceous materials such as solid fuel or oil shale, consisting in, passing the material downwardly, substantially continuously, with a tumbling motion from a retaining hopper into a hot zone, drawing air into said material in said hot zone through a large, free-tumbling, outer-wall surface exposed to the atmosphere and heating it thereby, withdrawing the resulting gases from within the mass of material in process at different levels, the lean gas produced in the upper region of the hot zone being withdrawn separately from the richer gas evolved in the lower and hotter region, passing the heated material downwardly into a cooler and introducing steam into the mass of hot material therein, removing the resulting reaction products along with the excess steam, and passing the cooled material downwardly and out.

11. In an apparatus for carbonizing solid fuel by passing it substantially continuously downwardly through a hot zone and utilizing internal combustion as a source of heat, in combination, a means of cooling and quenching the hot fuel consisting in a substantially cylindrical chamber into which said hot fuel is conducted from above and from which the cooled fuel passes out below, said chamber being open at both top and bottom and having a baffle on its wall sloping downwardly and inwardly into the fuel mass forming an annular space in the fuel mass, and having an inlet port into said annular space for a cooling fluid; and a means for removing the cooled fuel from said chamber, consisting in a rotating horizontal disk separate from and spaced below said cooling chamber.

12. In an apparatus for carbonizing solid fuel by passing it substantially continuously downwardly through an exposed combustion zone, an upright fuel container wherein the outer surface of the fuel is visible and freely exposed to the atmosphere, the outer casing of said container comprising a vertical series of baffles, spaced apart a sufficient distance to permit the fuel contained therein to be visible and exposed to the outer air, each baffle sloping downwardly and inwardly from without, and means for removing combustible gas from within the mass of fuel.

13. In an apparatus for carbonizing solid fuel by passing it substantially continuously downwardly through an exposed combustion zone, utilizing therein internal combustion as a source of heat, in combination, an upper charging hopper, a lower cooling hopper provided with a discharge mechanism, and an intermediate fuel container, wherein the outer surface of the fuel is visible and freely exposed to the atmosphere, the outer casing of said container comprising a vertical series of supported baffles, spaced apart a sufficient distance to permit the fuel contained therein to be visible and exposed to the outer air, each baffle sloping downwardly and inwardly from without, and means for removing combustible gas from within the mass of fuel.

14. An apparatus for carbonizing solid fuel by passing it substantially continuously downwardly through an exposed combustion zone, and utilizing therein internal combustion as a source of heat, comprising, in combination, an upper charging hopper, a lower cooling hopper provided with a discharge mechanism, and an intermediate fuel combustion chamber, said combustion chamber comprising an open, upright, cylindrical fuel container, the outer wall of said container comprising a vertical series of supported baffles, spaced apart a sufficient distance to permit the fuel contained therein to be visible and exposed to the outer air, said baffles having a common vertical axis, each baffle sloping downwardly and inwardly from without, means cooperating with the said outer baffles to produce a thin fuel bed in said combustion chamber, said cooperating means consisting in a vertical series of spaced internal baffles, each sloping downwardly and outwardly from within, and means for removing gas from within the mass of fuel consisting in a substantially vertical central gas offtake conduit supporting the said inner series of baffles, said conduit having gas ports therein at different levels.

In testimony whereof he affixes his signature.

WILLIAM W. ODELL.